United States Patent Office 3,574,100
Patented Apr. 6, 1971

3,574,100
WATER-SOLUBLE LUBRICATING AGENTS FOR CONTINUOUSLY MOVING CONVEYOR SYSTEMS
Clayton A. Wetmore, Skaneateles, N.Y., assignor to Cowles Chemical Company, Cleveland, Ohio
No Drawing. Filed Jan. 10, 1968, Ser. No. 696,689
Int. Cl. C10m 1/24, 1/26, 1/46
U.S. Cl. 252—32.5                           1 Claim

ABSTRACT OF THE DISCLOSURE

Lubricating compositions, which exhibit controlled foaming and are useful over a wide range of water hardness, are disclosed. The lubricating compositions are useful in lubricating and cleaning conveyor belts, chains and the like systems. The lubricating compositions preferably contain an ampholyte, which is preferably a derivative of a fatty primary amine and a salt of a phosphate ester of an oleyl alcohol ethoxylate. Methods for the use of these compositions are also disclosed.

BACKGROUND OF THE INVENTION (1) Field of the invention

My invention relates to a novel composition which exhibits excellent lubricating properties. More particularly, my invention relates to aqueous solutions of novel lubricating agents which are extremely useful for the lubrication of continuously-moving transport surfaces of conveyor systems; are operative over a heretofore unachievable range of water hardness and are characterized by contolled foaming under all conditions. My invention also relates to a novel method of lubricating continuously-moving transport surfaces of conveyor systems.

Continuously moving conveyor systems require cleansing and lubrication to insure that the system will function properly. For example, in those conveyor systems employed in bottling and capping operations, a clean and properly lubricated conveyor surface permits stoppage of the bottles during the filling and capping operations, while the belt continues to move underneath. If the belt does not clean and does not have the proper lubricity, serious problems arise at the operational station. The containers are knocked over or fail to stop moving, resulting in disruption of production.

Various materials have been employed in cleaning and lubrication of conveyor systems. For example, aqueous solutions of soap, sulfonated oils, and other surface-active products have been utilized, as well as alkanolamides, which are non-ionic surfactants.

The soaps and soap-containing products, inherently exhibit some lubricity because of their slippery, viscous nature. Hard water salts, however, adversely affect lubricity, and thus such agents are of limited application in hard water. Also, the alkanolamides, although effective at relatively low concentrations even in hard water, unfortunately exhibit lower cleaning and lubricity in comparison to the soaps.

Therefore, there exists a clear need for water soluble cleaning and lubricating agents which tolerate substantial amounts of hard water salts without adversely affecting their cleaning and lubricating properties. This invention provides such agents and methods for their use.

SUMMARY OF THE INVENTION

I have found unexpectedly that the lubrication problem accompanying the use of the above-described conveyor system lubricating compositions can be overcome by my novel lubricating composition. The novel lubricating composition of my invention comprises an aqueous solution of (a) a phosphate ester of an oleyl alcohol ethoxylate and (b) a water-soluble amphoteric compound selected from the group consisting of a derivative of imidazoline of the formula

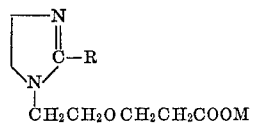

where M is hydrogen or a salt-forming cation and R is an alkyl radical containing from about 7 to about 18 carbon atoms, $RCH_2NHCH_2CH_2COOM$ and $$RCH_2N(CH_2CH_2COOM)_2$$

where M is hydrogen or a salt-forming cation and R is a fatty radical containing from about 8 to about 18 carbon atoms. The novel lubricating composition exhibits excellent lubricating properties, controlled foaming, and is extremely effective as a lubricant for continuously-moving conveyor systems over a wide range of water hardness. My composition also is a good cleaner for the conveyor system transporting surfaces.

In the novel cleaning composition the ratio of the amphoteric compound to the phosphate ester of an oleyl alcohol ethoxylate ranges between about 7:3 and about 3:7 (expressed in parts by weight per part by volume). When one part by volume of a concentrated aqueous solution containing 10 percent by weight per volume of the amphoteric compound and the phosphate ester of an oleyl alcohol is diluted with 200 parts by volume of water, excellent lubricating results are obtained. One part by volume of an aqueous solution containing 40 percent by weight per volume of soap cannot be diluted with more than about 50 parts by volume of water if even passable lubrication is to be obtained. So it is seen that very dilute solutions of the novel cleaning composition or solution, in comparison to soap solutions, can be utilized.

I have also unexpectedly found a method for lubricating the continuously moving transporting surfaces of a conveyor system which comprises introducing an aqueous lubricating solution onto the continuously-moving transporting surfaces of the conveyor system, said aqueous solution comprising (i) a water-soluble amphoteric compound selected from the group consisting of a derivative of imidazoline of the formula

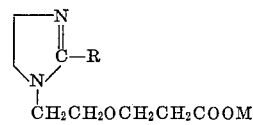

wherein M is hydrogen or a salt-forming cation and R is an alkyl radical containing from about 7 to about 18 carbon atoms, and propionates of the formula

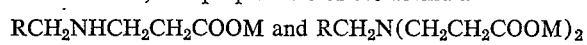

$RCH_2NHCH_2CH_2COOM$ and $RCH_2N(CH_2CH_2COOM)_2$ where M is hydrogen or a salt-forming cation and R is a fatty radical containing from about 8 to about 18 carbon atoms or (ii) a phosphate ester of an oleyl alcohol ethoxylate, or (iii) a mixture of (i) and (ii), or (iv) a mixture of (i) and an alkanolamide surfactant.

The term conveyor system is meant to encompass all types of continuously-moving conveyor belts, conveyor chains and other similar conveyor devices. The compositions of this invention can be used to lubricate any conveyor system, particularly those constructed from iron and/or steel.

DETAILED DESCRIPTION OF THE INVENTION

An amphoteric compound is a compound which is capable of acting either as an acid or a base, i.e., as a proton donor or acceptor, according to the nature of the environment. Amphoteric compounds are also termed ampholytes.

The water-soluble amphoteric compounds useful in the lubricating composition of this invention can be the derivatives of imidazoline. The ampholytes derived from imidazoline are commercially available from Mona Industries, Inc., under the trade name, "Monateric." The Monaterics have the conventional formula:

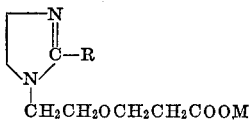

where M is hydrogen or a salt formig cation, such as sodium or potassium and R is an alkyl radical containing from 7 to 17 carbon atoms. The monaterics are described as 2-alkyl-1-(ethyl-beta-oxipropanoic acid) imidazolines or salts thereof, as described in Technical Bulletin No. 950, The Monateric-Amphoteric Surfactants, Mona Industries, Inc. The potassium salt of Monateric O-A is the preferred Monateric-type ampholyte. The R in Monateric O-A is the alkyl group which is derived from oleic acid. Monateric O-A has a molecular weight of 417 and an isoelectric point at pH 7.4. The Monateric-type ampholytes can be used in water of at least 35 grain hardness with no substantial reduction in performance.

The following specific ampholytes having an essentially linear structure are also useful in the novel lubricating composition of this invention. Those useful ampholytes having a linear-type structure are N-fatty-beta-aminopropionates and N-fatty-beta-iminodipropionates, which, respectively, have the following general formulas:

$RCH_2NHCH_2CH_2COOM$ and $RCH_2N(CH_2CH_2COOM)_2$ where M is hydrogen or a salt forming cation, such as sodium or potassium, and R is a fatty radical having from 8 to 18 carbon atoms. These amphoteric compounds are commercially available under the trademark, "Deriphat," and are manufactured by General Mills, Inc. The Deriphats are disclosed in Technical Bulletin 15-A, Derriphats-Amphoteric Surfactants, Chemical Division, General Mills, Inc., 1961, Rev. 4–65. The Deriphats are prepared by, first, reacting ammonia with a fatty acid to yield a fatty nitrile, which is, secondly, reacted with hydrogen to produce a fatty primary amine, which, in turn and lastly, is reacted to produce a Deriphat. Deriphat 151 is a typical preferred ampholyte. Deriphat 151 is sodium N-coco-beta-aminopropionate; has the general formula

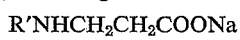

where R' is $RCH_2$; is available in flake form; has an isoelectric range pH of 2.1 to 4.2 at 25 percent solids in 3.7 percent HCl; has a solubility of 35 percent in water when in a solids 98 percent active form; is essentially insoluble in water in its isoelectric range; and is highly viscous at a pH of about 7 to 9.

The phosphate esters of an oleyl alcohol ethoxylate useful in the novel composition of this invention are the anionic salts, and preferably a mixture of the mono- and diesters is used. The mixture of esters is commercially available from General Aniline & Film Corporation under the trade name, "Gafac." Gafac GB 520 is the partial sodium salt, contains about 35 percent unreacted oleyl alcohol ethoxylate, is in the liquid form, and has a specific gravity of 1.03–1.04. The best mode of this invention utilizes a novel composition containing Gafac GB 520 and Deriphat 151.

The novel method of this invention for lubricating the continuously-moving transporting surfaces of the conveyor systems can be accomplished by utilizing the above-described ampholytes or phosphate esters or mixtures thereof. A mixture of the above-described ampholytes and an alkanolamide surfactant can also be used to effect the novel method. The preferred alkanolamide surfactant which can be used in conjunction with the above-described ampholytes is a diethanolamine mixed fatty acid amide which has an acid number of 45 to 50 and an alkali number of 105 to 115.

Lubricity is the property of forming a lubricating film between moving surfaces. Lubricity in the following specific examples was measured by placing 22 filled milk bottles on a typical conveyor belt utilizing stainless steel parts, continuously applying the test solution to the beginning end of the conveyor, and allowing the bottles to be pushed against a pan balance, which measures, in pounds, and is located at the end of the conveyor belt. A vessel which gravity-delivers 25 ml. per minute of the test solution is located at the beginning end of the conveyor. The lubricity has an inverse relationship to the number of pounds measured on the balance; therefore, the lower the number of pounds recorded, the greater the lubricity.

Foam height in the following specific examples was obtained by measuring the amount of foam built up between the bottles and is recorded as none, low, satisfactory, high or excessive. Detersiveness in the following specific examples was obtained by a visual observation of the best appearance and is rated as follows: Excellent—shiny belt with no smudge; Good—slight smudge which is readily removed; Fair—considerable smudge which is readily removed by washing; and Poor—heavy smudge which is difficult to remove.

The following specific examples illustrate my invention.

EXAMPLES I THROUGH VII

A conveyor belt was set up as described in the above description of how lubricity was measured. Various test solutions, namely, those labeled under the individual headings Samples or Examples I through VII, were diluted with certain amounts of water and each was tested separately, with the conveyor belt being cleaned after each run.

Sample or Example I is a 10 percent, by weight, solution of Deriphat 151 in distilled water. Deriphat 151 is sodium N-coco-beta-aminopropionate. Example II is a 10 percent, by weight, solution of Gafac GB 520 in distilled water. Example III is prepared by admixing four parts of the solution of Example I with six parts of the solution of Example II. Example IV is prepared by admixing five parts of the solution of Example I with five parts of the solution of Example II. Example V is prepared by admixing six parts of the solution of Example I with four parts of the solution of Example II. Example VI is an aqueous solution of a commercially available soap-type product containing approximately 35 percent actives equivalent to potassium stearate. Example VII is an aqueous solution of a commercially available amide-type product containing approximately 38 percent actives equivalent to diethanolamine coconut fatty acid amide.

TABLE A

[Evaluation in dilutions of tap water of 14 grains hardness (238 p.p.m.)]

| Example No. | Lubricity [1] 50:1 | Lubricity [2] 200:1 | Detersiveness 50:1 | Detersiveness 200:1 | Foam level 50:1 | Foam level 200:1 | Solution appearance 50:1 | Solution appearance 200:1 |
|---|---|---|---|---|---|---|---|---|
| I | | 10.5 | | Good | | Satisfactory | | Clear. |
| II | 12 | 11 | Excellent | Excellent | None | None | Clear | Slight haze. |
| III | | 10 | | do | | do | | Clear. |
| IV | 10.75 | 10.5 | Good | Good | Satisfactory | Satisfactory | Clear | Do. |
| V | 11 | 10.5 | do | do | High | do | do | Do. |
| VI [3] | 9 | 13 | Fair | Poor | Low | None | Hazy | Very cloudy. |
| VII [4] | 11.5 | 13.5 | do | Fair | High | Satisfactory | Cloudy | Cloudy. |

[1] One part of the example was diluted with 50 parts water.
[2] One part of the example was diluted with 200 parts water.
[3] Soap-type.
[4] Amide-type.

The properties of the Examples I to VII are listed in Table A.

The ampholyte exhibited superior properties as compared to the soap-type and amide-type compounds; so did the phosphate ester. The combination of the ampholyte with the phosphate ester yielded the best results. The combination composition can be used in water of at least 35 grain hardness without any substantial loss in performance characteristics.

EXAMPLES VIII AND IX

Various test solutions, namely, those labeled under the individual headings Samples or Examples VIII and IX, were diluted with certain amounts of water and each tested separately, with the conveyor belt being cleaned after each run.

Sample or Example VIII is a 10 percent, by weight, solution of the potassium salt of Monateric O-A in distilled water. Sample IX is a distilled water solution containing 5 percent by weight of diethanolamine mixed fatty acid amide which has an acid number of 45–50 and an alkali number of 105–115.

The properties of the Examples VIII and IX are listed in Table B.

TABLE B

[Evaluation at 200:1 dilution in tap water of 14 grains hardness]

| Example | Lubricity | Detersiveness | Foam level | Solution appearance |
|---|---|---|---|---|
| 8 | 13 | Good | Satisfactory | Clear |
| 9 | 11.5 | do | do | Do. |

Table B demonstrates the marked improvement of the imidazoline-derivative ampholytes, alone and with the amide-type products, over the soap-type products as lubricating solutions for steel and iron conveyor systems.

I claim:
1. A lubricating composition for lubricating continuously moving conveyor systems consisting essentially of an aqueous solution of (a) an alkali metal salt of a phosphate ester of oleyl alcohol ethoxylate and (b) 2-alkyl-1-(ethyl-beta-oxypropanoic acid)-imidazoline or alkali metal salt thereof, wherein the alkyl group contains from about 7 to about 18 carbon atoms.

References Cited

UNITED STATES PATENTS

| 2,468,012 | 4/1949 | Isbell | 260—534 |
| 2,773,068 | 12/1956 | Mannheimer | 260—309.6 |
| 3,033,889 | 5/1962 | Chiddix et al. | 260—461 |
| 3,310,489 | 3/1967 | Davis | 252—49.3X |
| 3,336,225 | 8/1967 | Sayad et al. | 252—49.3X |

FOREIGN PATENTS

| 847,321 | 9/1960 | Great Britain. |

DANIEL E. WYMAN, Primary Examiner

W. H. CANNON, Assistant Examiner

U.S. Cl. X.R.

252—33.6, 42.1, 49.3, 49.5, 51.5